United States Patent [19]
Dooley et al.

[11] 3,962,770
[45] June 15, 1976

[54] ELBOW PULLER

[75] Inventors: James P. Dooley, Peoria, Ill.; Roger O. Dake, Centralia, Mo.

[73] Assignee: A. B. Chance Company, Centralia, Mo.

[22] Filed: June 16, 1975

[21] Appl. No.: 587,433

[52] U.S. Cl. ............................... 29/203 H; 29/267; 29/282; 29/427; 254/131
[51] Int. Cl.² ......................................... H01R 43/00
[58] Field of Search ...... 29/203 H, 203 HM, 203 R, 29/427, 267, 268, 282; 254/131; 81/53.1

[56] References Cited
UNITED STATES PATENTS

| | | | |
|---|---|---|---|
| 2,457,258 | 12/1948 | Mitchell | 254/131 |
| 3,600,784 | 8/1971 | Prupst et al | 29/203 H |
| 3,606,660 | 9/1971 | Davis | 29/203 H |

*Primary Examiner*—Carl E. Hall
*Attorney, Agent, or Firm*—Schmidt, Johnson, Hovey & Williams

[57] ABSTRACT

A simple, low-cost, high mechanical advantage pulling tool especially adapted for use in detaching electrical termination appliances such as transformer elbows is provided which ensures quick, safe, elbow separation with reduced probability of flashover through the use of an elbow-gripping tool and a juxtaposed, pivotally interconnected, lever-actuated pushrod which permits the user to smoothly detach a stuck-in-place elbow without unsafe abrupt jerking movements which can cause the user to lose his balance in dangerously close proximity to energized electrical equipment. The tool includes an elongated, insulative pole having elbow-gripping structure thereon with an adjacent lever-actuated pushrod pivotally linked thereto permitting relative axial shifting movement between the pushrod and elbow-gripping pole. In use, the gripping section of the tool is operatively positioned about a detachable elbow and the pushrod is placed against the adjacent stationary transformer tank wall; pivotal manipulation of the lever handle interconnecting the pushrod and elbow-gripping rod simultaneously creates a pushing force through the pushrod and against the tank wall, and a corresponding, multiplied, oppositely directed pulling force on the elbow-gripping pole in order to quickly and smoothly detach the elbow. In preferred forms, the tool includes adjustment structure permitting the pushrod to be circumferentially shifted about the elbow gripping pole as needed in order to facilitate placement of the pushrod in a non-interfering position on the transformer tank wall. The tool can either be manufactured as a separate unit, or be fabricated using a conventional hot line tool with appropriate modification including a pushrod and operating lever handle.

17 Claims, 6 Drawing Figures

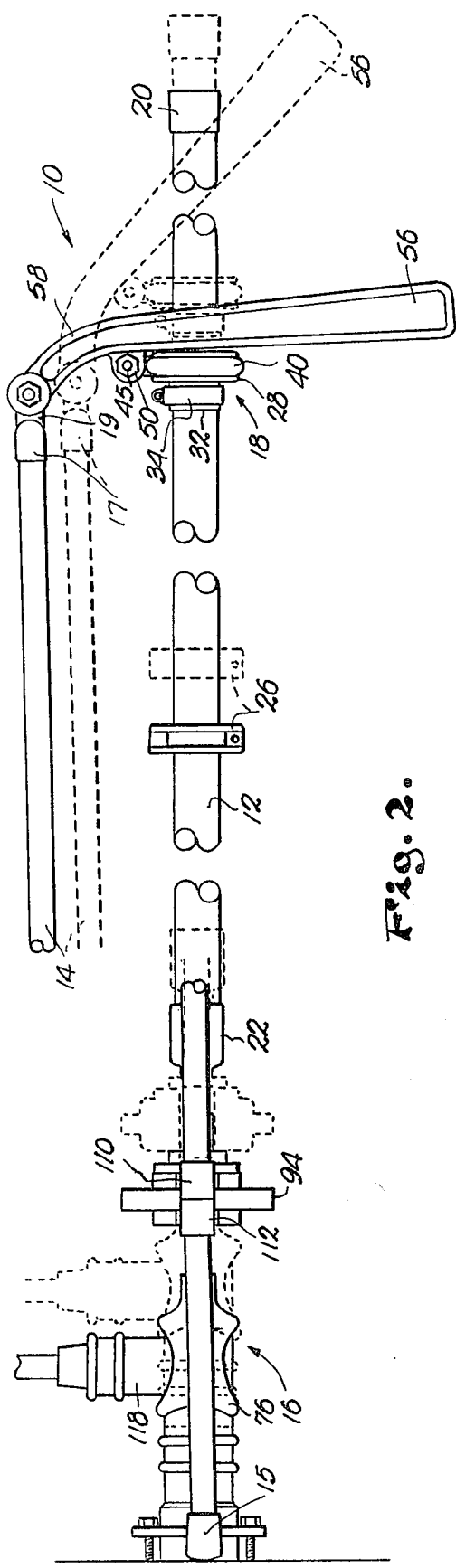
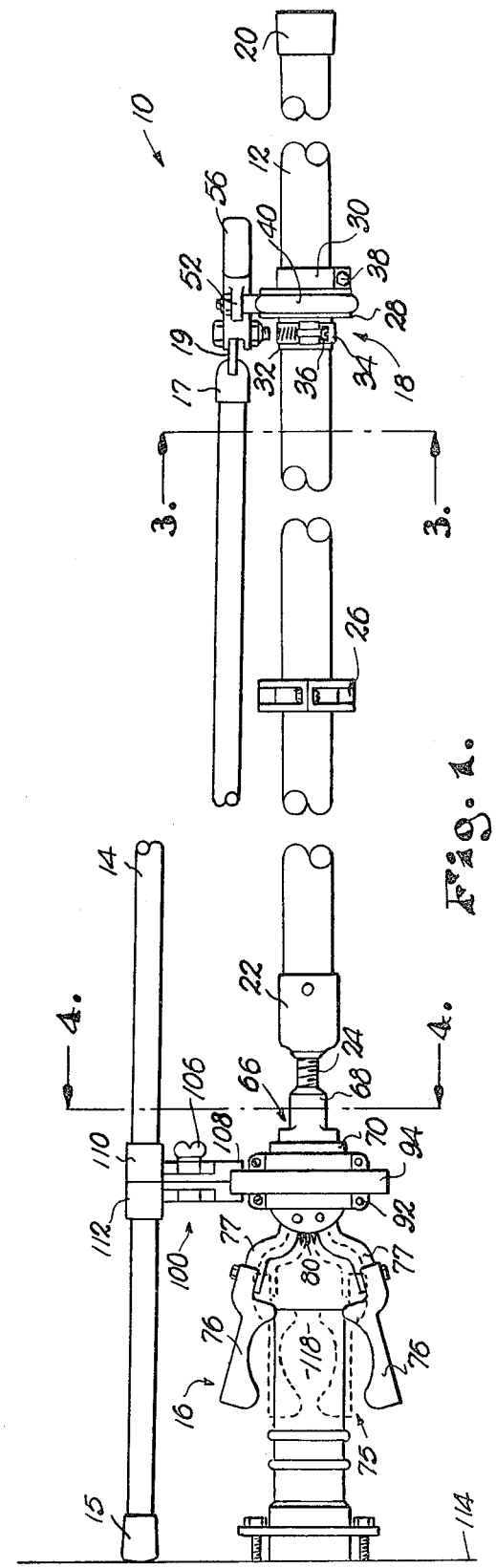

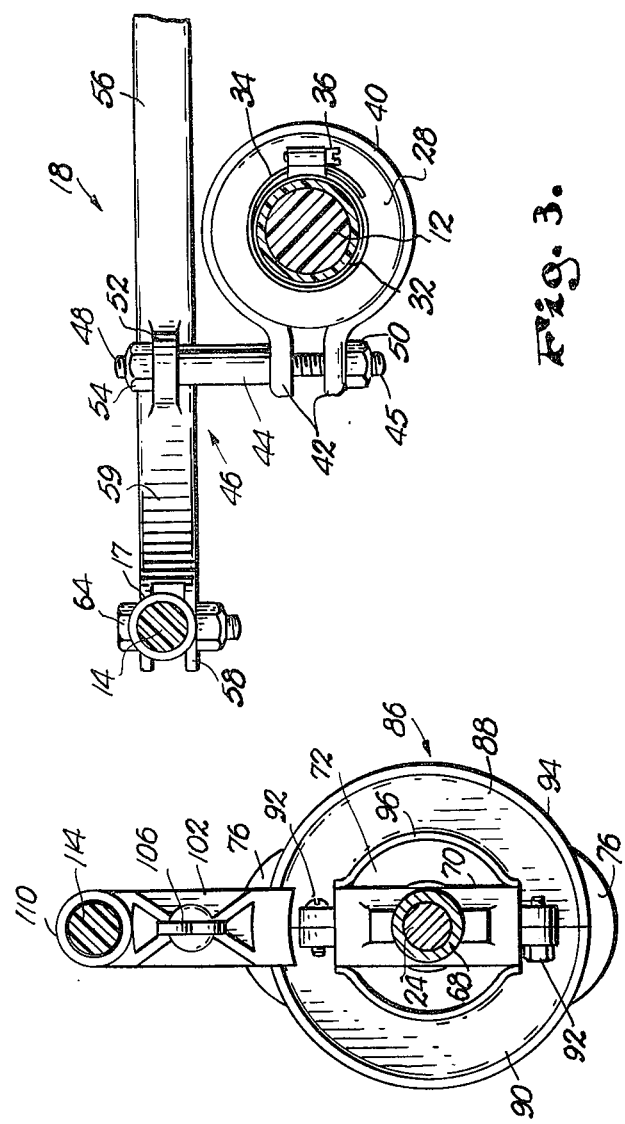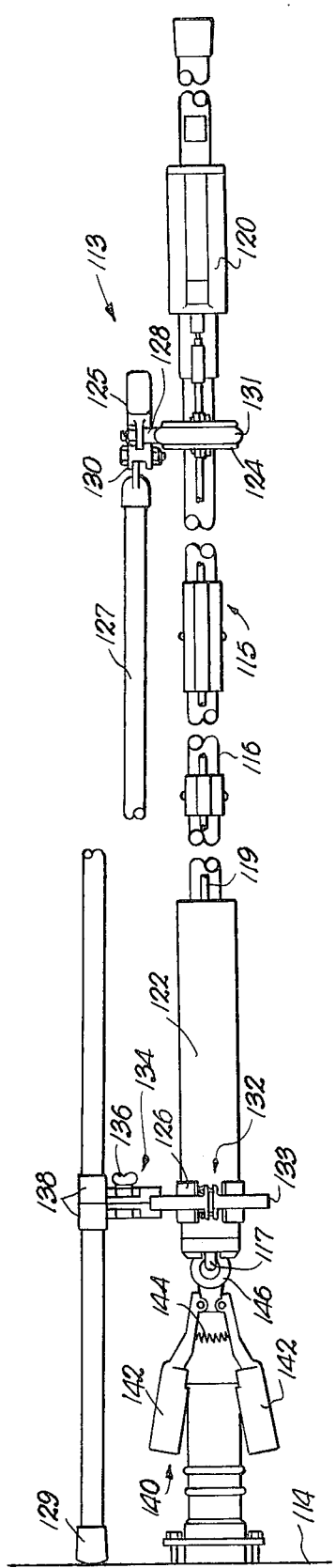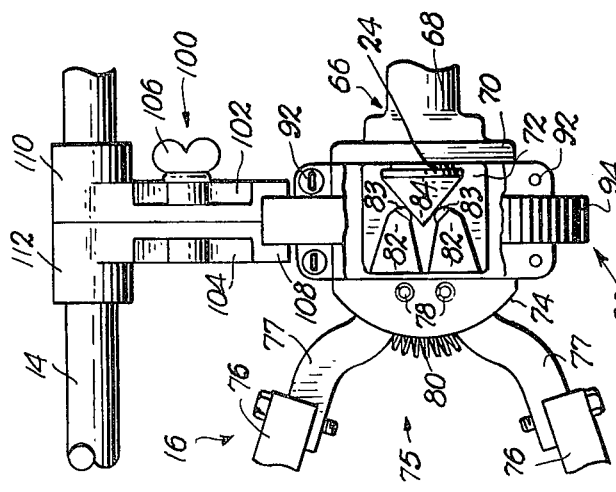

ELBOW PULLER

This invention relates to apparatus for quickly and easily pulling a detachable appliance from complemental holding structure therefor. More particularly, it is concerned with a pulling device especially suited for detaching URD (underground residential distribution) terminator elbows from pad-mounted transformers with a smooth, quick, safe, action which is developed through the use of a high mechanical advantage puller having an elongated elbow-gripping pole and a pivotally interconnected, lever-actuated pushrod.

Pad-mounted transformers and other URD electrical equipment are conventionally provided with terminator appliances connecting the equipment with underground transmission and distribution lines. These terminators normally include a central conductor and are configured for reception within complemental bushings or the like provided on the transformer or other equipment. For example, many pad-mounted transformers in use today include annular cup-like bushings on the forward tank wall thereof which are adapted to receive L-shaped terminator elbows in order to connect the transformer into the URD system. During installation, these elbows are normally coated with silicone grease or other type of lubricant and are installed over the complemental transformer bushings. Over time however, the silicone grease inevitably tends to harden with the result that a firm bond is established between the elbow and bushing. This problem is aggravated since in many instances terminator elbows will be removed only at very infrequent intervals (e.g., five years or more), and thus it is a quite common occurrence to find that the elbows are rigidly stuck in place and impossible to remove by hand even if this were an accepted practice.

It has been suggested in the past to provide elongated, insulative elbow pulling poles which are intended primarily to permit removal of terminator elbows without the necessity of grasping the same by hand or with conductive metallic tools. In general, these pulling poles comprise only an elongated hot line tool having a detachable elbow-gripping fixture secured to the forward end thereof. In use, the hot line tool is manipulated to close the elbow grippers around the stuck elbow, whereupon the lineman attempts to jerk the elbow free. This practice is of course undesirable since the lineman must in many instances exert considerable force on the elbow in order to free the same, and can actually fall to the ground during such jerking motions if the elbow is abruptly detached. As can be appreciated, it is extremely dangerous for a lineman to be off balance and out of control in close proximity to energized electrical equipment, and thus simple jerk-type elbow pulling tools can result in unsafe conditions.

Furthermore, prior elbow pulling tools of this type have proven to be deficient in that flashover to ground can occur between the energized contact of the elbow and adjacent grounded surfaces during elbow removal. This problem can result when the lineman does not pull the terminator cleanly from the corresponding bushing so that the elbow contact and a grounded surface are in relatively close proximity for a period of time sufficient to permit sustained arcing. This arc may flash to the nearest grounded point such as the transformer tank wall if the transformer is of the dead-front type. Hence, with simple pulling poles and the like the operator must on the one hand exert enough pulling force to quickly separate the elbow and prevent flashing over to ground, but on the other hand must not jerk the rod to the extent that he loses his balance. This operational problem is of course compounded since there is no way of knowing in a given situation whether and to what extent a particular elbow is stuck in place.

It is therefore the most important object of the present invention to provide a pulling tool especially adapted for the removal of pullably detachable appliances such a URD terminators and the like which ensures quick, safe, flashover-free separation with reduced arcing at the contacts thereof through the use of a lever-assisted device giving a high mechanical advantage to the operator so that he can quickly and cleanly pull the appliance free of the holding structure therefor without fear of exerting undue jerking or pulling actions on the tool which can lead to loss of control and balance on the part of the operator.

Another object of the invention is to provide a pulling tool employing an elongated appliance-gripping pole in conjunction with a relatively axially shiftable, lever-actuated pushrod pivotally connected thereto and adapted to abuttably engage a stationary surface adjacent the appliance to be pulled; this permits a smooth removal of the appliance through a pushpull tool action developed by pivoting the lever handle to produce a pushing force through the pushrod towards the stationary surface, and a corresponding, multiplied pulling action on the elbow-gripping pole.

Another object of the invention is to provide a pulling device as described above which includes adjustment structure for permitting selective circumferential positioning of the pushrod in any one of a number of positions around the elbow-gripping pole so that the pushrod can be positioned for noninterfering engagement on a stationary work surface adjacent the appliance to be pulled.

Yet another object of the invention is to provide a lever-actuated pulling tool which can be fabricated as a separate unit or be assembled using a conventional hot line tool by attaching a pushrod, lever handle and appropriate appliance-gripping structure thereto.

In the drawings:

FIG. 1 is a fragmentary side elevational view of a pulling tool in accordance with the invention, with the tool being prepared for use in detaching a URD elbow from a transformer tank wall and the gripping action of the opposed gripper sections being shown in phantom;

FIG. 2 is a fragmentary top plan view similar to that of FIG. 1 and depicting the appliance-removing operation of the present tool in phantom;

FIG. 3 is a fragmentary vertical sectional view taken along line 3—3 of FIG. 1 and illustrating the lever handle actuating structure of the tool;

FIG. 4 is a vertical sectional view taken along line 4—4 of FIG. 1 and illustrating the pushrod adjustment structure of the tool which permits the pushrod to be circumferentially adjusted relative to the elbow-gripping pole;

FIG. 5 is a fragmentary top plan view with parts broken away for clarity illustrating the mounting and operating structure of the opposed gripper sections; and FIG. 6 is another embodiment of the present invention showing the use of conventional hot line tool in combination with a detachable elbow-gripping fixture and a lever-actuated pushrod.

Elbow puller 10 in accordance with the present invention is best illustrated in FIGS. 1 and 2. Broadly, puller 10 includes an elongated, axially rotatable, insulative appliance-pulling pole 12 with an elongated, insulative epoxy pushrod 14 mounted in substantial side-by-side relationship therewith which is important for purposes to be made clear hereinafter. The forward end of tool 10 includes an adjustable elbow gripping assembly 16, while the rearward end has an actuating lever assembly 18.

In more detail, pole 12 is preferably composed of insulative epoxy material which is foam-filled with a conventional polyurethane foam. In addition, pole 12 is provided with a rearmost end cap 20 and a metallic ferrule 22 at the forward end thereof which rigidly secures an axially projecting threaded shaft 24 to pole 12. An insulative safety hand stop 26 is removably affixed midway between assemblies 16 and 18 in order to prevent a lineman's hand from inadvertently coming into close proximity with the metallic components at the forward end of tool 10. Pushrod 14 is preferably composed of a solid fiberglass reinforced epoxy material and has a wall-engaging cap 15 at the forward end thereof, along with a ferrule 17 supporting an axially projecting, apertured tang 19 at the rearward end of the pushrod.

Referring now to FIG. 3, it will be seen that lever handle assembly 18 includes a radially expanded, circumferentially grooved annular collar 28 positioned about primary pole 12 and having an annular, axially extending flange 32 which surrounds pole 12. A metallic hose clamp 34 adjustably secured by screw means 36 is positioned about forwardly extending flange 32. In addition, a separate, eared metallic collar 30 is positioned about pole 12 in abutting engagement with the rear surface of collar 28, with a tightening nut 38 extending through the adjacent eared portions thereof for tightening collar 30 into place. Screw 36 is preferably tightened to a point which stablizes assembly 18 but nevertheless permits axial rotation of pole 12 therewithin.

Expanded collar 28 includes a circumferentially extending groove which supports a shiftable annular metallic ring 40 having a pair of opposed, apertured ears 42. A spacer stud 44 having opposed, oppositely extending axial threaded portions 45 and 48 is also provided for the purpose of mounting lever handle 46 on circumferentially shiftable ring 40. In particular, threaded portion 45 extends through the opposed ears 42 of ring 40 with a nut 50 being provided for adjustably tightening ring 40 about collar 28 at any desired orientation thereon. An integral, projecting, apertured eye portion 52 on handle 46 receives threaded portion 48 of stud 44, with a nut 54 acting to releasably and pivotally secure handle 46 in position on the stud. As shown in FIGS. 1–3, handle 46 includes an elongated gripping section 56 and an integral linkage section 58, with the entire handle being pivotal about an axis defined by stud 44. It is to be noted in this respect that pivot axis of handle 46 is generally perpendicular to the longitudinal axes of pole 12 and rod 14, and to the axis of linkage section 58.

An integral clevis 58 is provided at the end of linkage section 58 remote from stud 44 for the purpose of pivotally mounting pushrod 14. In this regard, apertured tang 19 of pushrod 14 is received within clevis 58 and is secured therein by means of clevis bolt 64. Thus, it will be seen that pushrod 14 is pivotally interconnected with pole 12 through linkage section 58 so that the pole 12 and pushrod 14 are axially shiftable relative to each other.

Elbow gripping assembly 16 of tool 10 (see FIG. 5) includes a flattened gripper-supporting fixture 66 having a rearwardly extending tubular threaded member 68 which threadably receives and is supported by stud 24 affixed to pole 12. Fixture 66 includes an open bottom and top main body portion 70 which defines a central chamber 72 and has an apertured, arcuate front face 74. An appliance-gripping device 75 in the form of a pair of opposed, complementally configured gripper sections is also provided, with the gripper sections being pivotally mounted within the open front 74 of main body 70. In this connection, the gripper sections include respective forward gripping portions 76 especially configured to grip an L-shaped terminator elbow, and metallic connective elements 77 which are pivotally supported as at 78 within fixture 66. A spring 80 extends between the pivotal connective elements 77 and acts to normally bias these elements apart.

Referring specifically to FIG. 5, it will be seen that each element 77 also includes a rearwardly extending portion 82 which extends within chamber 72 and terminates with structure presenting a rounded cam surface 83, with the respective surfaces 83 of the elements 77 being proximately disposed. In addition, a generally conical wedge block 84 is affixed to the forward end of shaft 24 and is configured and arranged for camming contact with the respective adjacent surfaces 83 upon advancement of shaft 24 into chamber 72.

Annular track structure 86 in the form of a pair of opposed, identical, semicircular castings 88 and 90 is positioned about body 70 and releasably secured in place by means of screws 92 which extend through opposed, apertured ear portions on the respective track-defining sections. Sections 88 and 90 cooperatively present track structure having a continuous, circumferentially extending outer rim 94 and inner rounded body-engaging segments 96 and 98 which seat on opposed faces of body 70 and substantially surround and enclose central chamber 72. Circumferentially shiftable track-gripping structure 100 is seated on and supported by track structure 86 and includes a pair of elongated, opposed, complemental sections 102 and 104 which are releasably secured together by means of thumbscrew 106. Sections 102 and 104 cooperatively present at one end thereof appropriately configured track-gripping means 108 which is operable to releasably grip rim 94 upon tightening of thumbscrew 106. In addition, the remaining end of the elongated sections 102 and 104 are provided with axially aligned, tubular, pushrod-receiving segments 110 and 112 which shiftably support pushrod 14 in spaced relation to pole 12.

The operation of puller 10 is best described with reference to FIGS. 1 and 2 which illustrate the use of puller 10 in removing a detachable URD elbow from a conventional pad-mounted transformer. Such a transformer would include an oil tank having a forward tank wall 114 with an elbow-receiving bushing thereon which supports a conventional L-shaped elbow terminator 118. When it is desired to remove elbow 118 from the bushing, the following procedure is generally followed. First, the operator grasps tool 10 and axially adjusts lever handle assembly 18 in order to assure that the forward end of pushrod 14 can engage wall 114 while device 75 simultaneously grips elbow 118. This adjustment can generally be accomplished simply by shifting lever handle 56 in order to extend pushrod 14 the required extent for engagement with tank wall 114. If this is not possible however, the adjustment can be effected by loosening screws 36 and 38 and axially shifting collars 28 and 30 on pole 12, whereupon the screws are retightened to stablized assembly 18. It will be noted that since the forward end of pushrod 14 is freely slidable within tubular sections 110 and 112, no resistance is presented to any axial adjustment of the pushrod which may be required.

The next step involves circumferentially adjusting rod 14 as necessary in order to clear other terminators or hardware on tank wall 114 and provide an adequate working space on the tank wall. This involves loosening thumbscrew 106 interconnecting sections 102 and 104 and circumferentially shifting the track-gripping structure 100 (along with pushrod 14 captured within tubular sections 110 and 112) as needed to clear any proximal interferring equipment. At this point, screw 106 can simply be retightened whereupon the respective sections 102 and 104 again releasably but securely grip track structure 86 as described. At this point it may be necessary to rotate lever handle assembly 18 but since this assembly is not rigidly affixed to pole 12 this operation can be accomplished without difficulty.

The operator next positions tool 10 such that the biased-apart gripping sections 76 thereof are disposed about the L-shaped elbow 118, as shown in bold lines in FIG. 1. The operator then commences axial rotation of primary pole 12 in a clockwise direction, which has the effect of advancing shaft 24 and conical wedge 84 forwardly relative to the gripper sections. Referring specifically to FIG. 5, it will be seen that such advancement has the effect of progressively closing the gripper sections 76 by virtue of the camming engagement between wedge 84 and surfaces 83, so that the sections close and grip elbow 118 as shown in phantom in FIG. 1.

The final step in the removal procedure involves firmly grasping pole 12 and handle section 56 and rotating the latter in the direction illustrated in phantom in FIG. 2. This action causes a pushing force to be transmitted through link section 58 and pushrod 14 towards stationary wall 114. At the same time, a corresponding, multiplied pulling force on pole 12 is produced by virtue of the pivoting of lever handle 46. The resultant push-pull action through pushrod 14 and appliance-pulling pole 12 thus creates a smooth, clean rearwardly directed detachment force on gripped elbow 118 in order to assure the quick and safe removal thereof from the transformer bushing. Furthermore, the high mechanical advantage obtained through lever-actuated puller 10 not only facilitates removal of elbow 118 but also ensures that the lineman does not have to pull with a jerking action which can cause him to lose his balance and even fall to the ground upon detachment of the elbow. The characteristic quick detachment of elbow 118 also reduces the duration and severity of any arcing which occurs between the contacts of the transformer bushing and the elbow which can cause burning and pitting of these contacts. Thus, use of tool 10 permits extremely safe yet efficient detachment of removable electrical appliances and the like without fear of operator hazard or damage to the electrical equipment.

Although the above discussion has centered around an elbow puller which is designed to be manufactured as a complete unit, it is to be understood that the present invention is not so limited. That is, the inventive concepts hereof can easily be applied to conventional hot line manipulative tools which are in common use in the electrical industry. This particular embodiment of the invention is illustrated in FIG. 6 wherein a pulling tool 113 includes a conventional hot line tool 115 which has an insulative central pole 116 and a forward claw 117 which is situated within a hollow, radially expanded forward end 122 of the tool. Claw 117 is axially reciprocable with respect to tool 115 and is pivotally secured to an elongated actuating rod 119 which extends between a rearward rack and tooth assembly 120 and the forward end 122 of the tool. Reciprocation of rod 119 is operable to selectively open and close claw 117 as the latter emerges from and enters hollow end 122 of the tool.

The details of construction of the elbow pulling tool 113 of this embodiment insofar as the pushrod, lever handle and adjustment structure are concerned are essentially identical with those of the first described embodiment. For example, pushrod 127 is an insulative, fiberglass reinforced epoxy member capped at the forward end thereof with wall-engaging cap 129, with the pushrod being pivotally supported at the rearward end thereof by clevis 130 forming a part of lever handle 125. The latter is supported by a stud 128 which is in turn mounted on an adjustable ring 131 seated on two-section collar 124. Collar 124 is situated adjacent the rearward end of tool 115 and is appropriately configured to permit actuating rod 119 to reciprocate relative thereto.

A two-section removable casting 126 is secured to forward end 122 of tool 115, with the sections cooperatively defining a radially expanded track structure 132 which is similar to previously described structure 86 and includes an outermost supporting rim 133 which supports circumferentially shiftable, two-section track-gripping apparatus 134. The abutting sections of apparatus 134 are releasably secured together by means of thumbscrew 136, and include tubular pushrod-receiving sections 138 for slidably supporting the adjacent pushrod 127.

A detachable elbow-gripping device 140 is preferably employed with this embodiment and is of the general type described in U.S. Pat. No. 3,606,660. Device 140 includes a pair of opposed, pivotally mounted grippers 142 which are biased apart by central spring 144. The respective grippers 142 are supported on a rearwardly extending eye 146 which as shown is configured for receiving claw 117 of tool 115.

The use of pulling tool 113 is essentially identical with that of tool 10 and thus will not be described in complete detail. However, in order to close sections 142 of device around elbow 118 it is necessary to pull actuating rod 119 rearwardly through the use of rack and tooth assembly 120 in order to retract claw 117 within hollow end 122. This in turn progressively closes the sections 142 as they are drawn into end 122. When elbow 118 is tightly gripped by sections 142 assembly 120 can be locked to hold the gripper sections in place. In all other respects, the lever-actuated, push-pull operation of tool 113 is identical with that of tool 10 and serves in like manner to quickly and safely detach elbow 118. In addition, pushrod 127 can be both longitudinally and circumferentially adjusted as needed in a manner essentially identical with that described above in connection with tool 10.

It will also be appreciated that essentially any other appliance-gripping means could be used to good advantage in the present invention. That is, differently configured jaws adapted to grip various pullably detachable appliances (either electrical or otherwise) could be substituted for those specifically disclosed herein without departing from the spirit and scope of the present invention.

Having thus described the invention, what is claimed as new and desired to be secured by Letters Patent is:

1. An appliance pulling tool, comprising:
    an elongated appliance-pulling pole;
    means adjacent one end of said appliance-pulling pole for gripping a pullably detachable appliance;
    an elongated pushrod having one end thereof adapted for engagement with a stationary surface proximal to said appliance;
    means shiftably mounting said pushrod on said appliance-pulling pole in general side-by-side relationship therewith, with said appliance-gripping means and surface-engaging end being proximally disposed,
    said mounting means including an elongated link pivotally connected to said appliance-pulling pole and pushrod respectively; and
    operating means for pivoting said link about an axis to produce a pushing force on said pushrod towards said stationary surface and a corresponding pulling force on said appliance-pulling pole.

2. The tool as set forth in claim 1 wherein said appliance-gripping means is configured for releasably gripping a transformer terminator, and said surface-engaging end of the pushrod is adapted to engage a transformer tank wall proximal to said terminator.

3. The tool as set forth in claim 1 wherein said appliance-gripping means comprises a pair of opposed, pivotal, complemental gripper sections, there being means normally biasing said sections apart.

4. The tool as set forth in claim 3 including means supporting said gripper sections which comprises:
    a gripper section-supporting fixture pivotally supporting said sections, each of the latter having a portion extending rearwardly from the pivotal connection thereof away from the forward gripping portion of the section;
    a threaded shaft affixed to one end of said appliance-pulling pole and threadably supporting said fixture at a position remote from the forward gripping portions of said sections; and
    a conical wedge secured to the end of said shaft remote from said appliance-pulling pole, said wedge being configured and arranged to engage said rearwardly extending gripper portions upon advancement of said shaft for closing said sections against the bias of said biasing means.

5. The tool as set forth in claim 3 wherein said appliance-gripping means is detachable from said appliance-pulling pole.

6. The tool as set forth in claim 5 wherein said appliance-gripping means includes an eye at the rearward end thereof, and means supporting said detachable appliance-gripping means comprising:
    an axially shiftable, pivotally mounted claw positioned in one end of said appliance-pulling pole and operable to extend through said eye for releasably supporting said appliance-gripping means; and
    operating means for selectively shifting said claw to close the latter and support the appliance-gripping means.

7. The tool as set forth in claim 1 including adjustment means for permitting selective movement of said pushrod circumferentially about said appliance-pulling pole, there being means for locking the pushrod at any desired circumferential position about the pole.

8. The tool as set forth in claim 7 wherein said adjustment means comprises:
    collar means adjacent the end of said appliance-pulling pole suupporting said appliance-gripping means and presenting circumferentially extending track structure; and
    connecting means including a tubular element shiftably receiving said pushrod, and releasable track-gripping means operable to be shifted along said circumferential track structure and grip the latter at any desired position therealong.

9. The tool as set forth in claim 1 wherein said mounting means includes structure permitting the axial adjustment of said pushrod relative to said appliance-pulling pole.

10. The tool as set forth in claim 1 wherein said operating means includes an axially aligned lever handle secured to said link.

11. The tool as set forth in claim 9 wherein said lever handle is mounted for rotating said link about an axis generally perpendicular to the longitudinal axis of the link, and generally perpendicular to the longitudinal axes of said appliance-pulling pole and pushrod.

12. The tool as set forth in claim 10 wherein said operating handle and link are integral.

13. The tool as set forth in claim 1 wherein at least the outer surfaces of said appliance-pulling pole and pushrod are formed of fiberglass reinforced resin material.

14. The tool as set forth in claim 13 wherein said appliance-pulling pole is filled with a polyurethane foam material.

15. The tool of claim 13 wherein said resin material is an epoxy.

16. For use with an elongated pole adapted to operatively support means adjacent one end thereof for gripping a pullably detachable appliance, the combination comprising:
    an elongated pushrod having one end thereof operable for engagement with a stationary surface proximal to said appliance;
    means for shiftably mounting said pushrod on said pole in general side-by-side relationship therewith, with said appliance-gripping means and surface-engaging end being proximally disposed,
    said mounting means including an elongated link adapted for pivotal connection to said pole and pushrod respectively; and
    operating means for pivoting said link when the latter is connected between said pole and pushrod to produce a pushing force on said pushrod towards said stationary surface and a corresponding pulling force on said pole.

17. The combination of claim 16 including adjustment means for permitting selective movement of said pushrod circumferentially about said pole, there being means for locking the pushrod at any desired circumferential position about the pole.

* * * * *